United States Patent Office 3,786,138
Patented Jan. 15, 1974

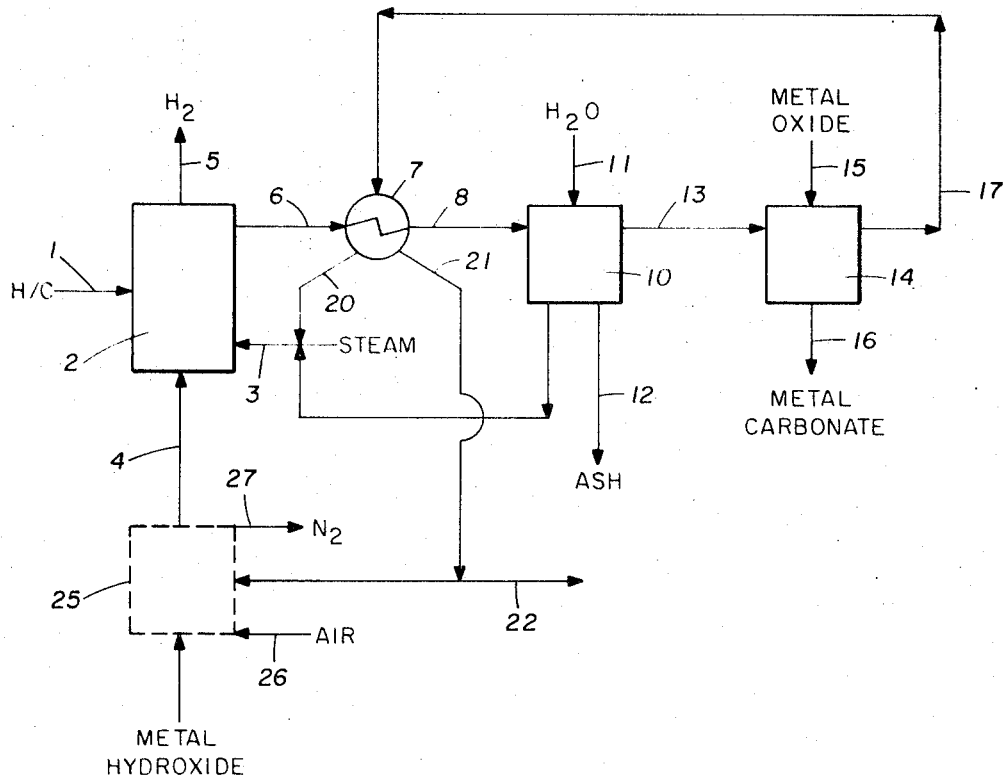

3,786,138
HYDROGEN GENERATION
Harold Shalit, Drexel Hill, and Edward S. J. Tomezsko, Media, Pa., assignors to Atlantic Richfield Company, New York, N.Y.
Filed Aug. 16, 1971, Ser. No. 172,046
Int. Cl. C01b 1/02, 1/26
U.S. Cl. 423—648                                8 Claims

ABSTRACT OF THE DISCLOSURE

A method for forming hydrogen by reacting a carbonaceous material with steam in the presence of a molten alkali metal hydroxide, the carbon dioxide formed reacting with the alkali metal hydroxide to form an alkali metal carbonate, the reaction being carried out at least at the melting point of the alkali metal hydroxide and the alkali metal hydroxide being supplied in an amount at least sufficient to react with substantially all the carbon dioxide formed during the reaction.

BACKGROUND OF THE INVENTION

Heretofore in a conventional water gas reaction process a carbonaceous material is reacted with steam to produce hydrogen, methane, carbon monoxide and carbon dioxide. This reaction is carried out in a reformer and the product gases are transferred from the reformer to a shift converter wherein the carbon monoxide is reacted with steam to form carbon dioxide and hydrogen. The product gases from the shift converter are then passed to a carbon dioxide absorber followed by a demethanizer from which a hydrogen gas product is obtained. This hydrogen gas product normally contains varying minor amounts of methane, carbon monoxide, and carbon dioxide as impurities. Such a process is fully and completely disclosed in U.S. Pat. 3,387,942, the disclosure of which is incorporated herein by reference.

Heretofore coal gasification in the Kellogg process has been carried out at temperatures of from 1500 to 2000° F., using molten sodium carbonate as a heat transfer agent and catalytic material for the endothermic carbon-steam reaction necessary for coal gasification. This process is fully and completely disclosed in a paper by Lefrancois et al., ACS Division of Fuel Chemistry, 152nd ACS National Meeting, pages 198–205, 1966, New York, N.Y., the disclosure of which is incorporated herein by reference. In this paper, it is taught on page 204 that the addition of carbon dioxide retards the rate of coal gasification significantly, e.g., in one case a 25% rate decrease. Along the same lines, U.S. Pat. 3,252,774, the disclosure of which is incorporated herein by reference, teaches the production of a hydrogen-containing gas by passing steam and a normally liquid hydrocarbon through a molten reaction medium which must contain at least in part an alkali metal carbonate and which can contain a mixture of carbonate and hydroxide. The alkali metal carbonate in this patent is a required starting material as with the Kellogg process.

U.S. Pat. 2,517,177, the disclosure of which is incorporated herein by reference, discloses a method for producing hydrogen by reacting carbon monoxide with steam using a catalyst which contains amorphous carbon, a hydroxide of an alkaline earth metal, and a hydroxide or carbonate of an alkali metal.

SUMMARY OF THE INVENTION

According to this invention, there is provided a method for generating hydrogen gas by charging to a reaction zone at least one alkali metal hydroxide which is substantially free of any alkali metal carbonate and which is substantially molten (liquid) at the elevated temperature of the reaction, and reacting the at least one alkali metal hydroxide at least in part with carbon dioxide formed in the reaction zone to form an alkali metal carbonate thereby removing carbon dioxide from the reaction and forcing the reaction in the direction of hydrogen formation and at the same time providing additional water from which to form additional hydrogen. The alkali metal hydroxide is supplied in an amount sufficient to react with substantially all the carbon dioxide formed during the reaction.

In one aspect of this invention, the alkali metal hydroxide is formed from at least one of the metals sodium, potassium, rubidium, cesium, and francium, and a portion of the alkali metal hydroxide to be charged to the reaction is oxidized to the corresponding alkali metal peroxide. The peroxide then reacts with some of the carbonaceous material in the reaction zone to supply heat to the hydrogen generation reaction.

In another aspect of this invention, the reaction product stream sans hydrogen is treated to precipitate ash and to remove carbonates as alkaline earth metal oxides thereby regenerating the alkali metal hydroxide for reuse as a carbonate-free reactant in the hydrogen generation reaction.

By following the teachings of this invention, a number of significant advances are obtained. Whereas, the conventional water-gas reaction is carried out at temperatures of 1300–1600° F., the reaction of this invention is carried out at substantially lower temperatures so long as the highest melting alkali metal hydroxide present in the reaction zone is maintained substantially in the liquid state. This means generally that the reaction temperatures of this invention can be substantially less than 1300° F. so that a significant thermal economy is realized according to this invention as opposed to the higher temperature water-gas reaction and Kellogg process. Although not known to a certainty, and therefore not desiring to be bound thereby, it is presently thought that at least with solid carbonaceous feed materials, the molten alkali metal hydroxide coats the carbonaceous particle, that the steam has to penetrate the alkali metal hydroxide coating to reach the particle, and that the hydrogen generation reaction is carried out at the interface between the alkali metal hydroxide coating and the carbonaceous particle. Thus, contrary to the conventional water-gas reaction, an increase in reaction pressure can have the result of an increased hydrogen generation rate by forcing the steam through the alkali metal hydroxide coating at a faster rate.

Since carbon dioxide is removed from the reaction by the formation of alkali metal carbonate, the reaction is constantly forced toward the hydrogen formation side of the equation. This minimizes the amount of carbon monoxide and methane formed and/or retained in the reaction mass so that there is substantially no carbon dioxide, carbon monoxide, or methane formed during the reaction or maintained in the reaction mass. The hydrogen product then is purer than that normally achieved in a water-gas reaction in that the hydrogen product of this invention contains substantially no carbon monoxide, carbon dioxide, or methane. Even when air is employed to oxidize part of the alkali metal hydroxide to a peroxide, the hydrogen gas product is not contaminated with nitrogen.

By following this invention, the shift converter, carbon dioxide absorber, and demethanizer are all eliminated without eliminating their functions. The use of an alkali metal peroxide is a convenient and a noncontaminating method for supplying heat to the reaction. The molten alkali metal hydroxide provides an excellent heat sink for the maintenance of a constant temperature. Ash constituents are readily separated from the reaction mixture by aqueous dilution and substantially no make up alkali metal hydroxide is necessary since alkali metal values in the ash will end up as the hydroxide. Agglomeration and/or melting of solid feed material is no problem since the reaction is carried out in the liquid state.

The combination of the reactions of (1) carbon with steam to produce carbon monoxide and hydrogen and (2) carbon monoxide with steam to produce carbon dioxide and hydrogen gives a combined reaction of one mol of carbon with two mols of steam to produce one mol of carbon dioxide and two mols of hydrogen. This is an endothermic reaction. The reaction of one mol of carbon dioxide with one mol of alkali metal hydroxide gives one mol of alkali metal carbonate and one mol of water. This is an exothermic reaction. The overall reaction of two mols of alkali metal hydroxide with one mol of carbon and one mol of steam to give one mol of alkali metal carbonate and two mols of hydrogen is a net exothermic reaction so that substantial quantities of external heat need not be supplied to carry out the reaction of this invention. If any heat is supplied, it can be supplied by a noncontaminating source such as by way of decomposing alkali metal peroxides. Thus, the reactions according to this invention are thermally balanced so that there is a net exothermic result notwithstanding the fact that the reaction of carbon with steam to produce carbon dioxide and hydrogen is highly endothermic.

Accordingly, it is an object of this invention to provide a new and improved method for generating hydrogen. It is another object to provide a new and improved method for forming hydrogen from carbonaceous material without contaminating the hydrogen product with carbon monoxide, carbon dioxide, or methane. It is another object to provide a new and improved method for forming hydrogen from carbonaceous material wherein the net reaction is exothermic. It is another object to provide a new and improved method for forming hydrogen wherein one reactant can be regenerated and reused ad infinitum.

Other aspects, objects, and advantages of this invention will be apparent to those skilled in the art from this disclosure and the appended claims.

DETAILED DESCRIPTION OF THE INVENTION

The drawing shows diagrammatically one process within this invention.

More specifically, the drawing shows a feed carbonaceous material passing by way of pipe 1 into reaction zone 2. Steam passes into reaction zone 2 by way of pipe 3 and at least one alkali metal hydroxide or a mixture of at least one alkali metal hydroxide with at least one alkali metal peroxide passes into reaction zone 2 by way of pipe 4. The alkali metals employed can be one or any combination of lithium, sodium, potassium, rubidium, cesium, and francium. Lithium-hydroxide is acceptable provided it is not used alone when a peroxide is desired, since it is not oxidized by air to form a peroxide. The other alkali metal hydroxides are satisfactory alone or in mixtures even when the peroxide is desired. Any type of reactor can be used for zone 2, although a presently preferred reactor would employ a counter-current stream of alkali metal hydroxide coated carbonaceous particles dropping through an upflowing pressurized stream of steam. The alkali metal hydroxide stream in pipe 4 contains substantially no carbonate of any alkali metal hydroxide or any other metal so that an important step in the practice of this invention is to deliberately exclude externally supplied metal, particularly alkali metal, carbonate, from reaction zone 2. This is important so that all carbon dioxide formed will more readily be converted to the carbonate, thereby removing the carbon dioxide from the reaction and enhancing the formation of hydrogen, and so that a lower viscosity is maintained. Thus, this invention deliberately excludes metal carbonates even in minor amounts from pipe 4.

A hydrogen product is removed from reaction zone 2 by way of pipe 5. This stream contains substantially only hydrogen and substantially no carbon monoxide, carbon dioxide, methane, and nitrogen.

The molten reaction mass, containing alkali metal hydroxide and sulfates, nitrates, silicates, carbonates, and the like which can generally be referred to as ash, passes from reaction zone 2 by way of pipe 6 to heat exchange zone 7 wherein the reaction mass is cooled but not below the melting point of the mass (the highest melting metal hydroxide present). The cooled reaction mass then passes by way of pipe 8 to first separation zone 10.

In first separation zone 10, water in a liquid and/or vaporous state is passed by way of pipe 11 into separation zone 10 and mixed with the molten reaction mass therein. Generally, at least about 100 weight percent water will be added based on the weight of the reaction mass in separation zone 10. This dilution and cooling step results in the precipitation of ash components, particularly silicates, and carbonates of heavier metals such as iron, nickel, cobalt, vanadium, and the like. Precipitated ash is removed from zone 10 by way of pipe 12.

The aqueous molten reaction mass, which can still contain some amounts of carbonates and sulfates and perhaps nitrates, passes by way of pipe 13 to second separation zone 14. A metal oxide such as an alkaline earth metal oxide is added to separation zone 14 by way of pipe 15 to react in zone 14 with the alkali metal carbonates present to form alkaline earth metal carbonates which precipitate and are removed by way of pipe 16.

The regenerated aqueous alkali metal hydroxide which can contain minor amounts of alkali metal sulfates and nitrates is removed from separation zone 14 by way of pipe 17 and returned to heat exchange zone 7. In zone 7 it is passed in heat exchange relationship with heated reaction mass from pipe 6. By passing in this heat exchange relationship, the regenerated alkali metal hydroxide in pipe 17 is dehydrated in that the water therein is converted to steam and the steam separately removed by way of pipe 20 for addition to pipe 3 and reuse in reaction zone 2. The molten alkali metal hydroxide is recovered separately from the steam by way of pipe 21 and can be returned to pipe 4 for reuse as a reactant in reaction zone 2.

If it is desired to reduce the sulfate content in the regenerated alkali metal hydroxide stream in pipe 21, a part of that stream can be bled off by way of pipe 22, otherwise all or any part of the stream in pipe 21 can be reused as the alkali metal hydroxide reacted in zone 2.

If it is desired to employ some alkali metal peroxide in reaction zone 2, the alkali metal peroxide can be added to pipe 4 or can be obtained in any other manner so long as some alkali metal peroxide ends up in reaction zone 2. A suitable peroxide or mixture of peroxides can be added directly to zone 2 if desired. One convenient manner for providing alkali metal peroxide is shown by dotted box 25 wherein air from pipe 26 is bubbled through the alkali metal hydroxide in pipe 4 and/or pipe 21 at a temperature of from about 750 to about 1200° F., thereby oxidizing part of the alkali metal hydroxide present to the corresponding peroxide and leaving oxygen depleted air which is removed by way of pipe 27 so that this nitrogen containing gas cannot contaminate the hydrogen product in pipe 5. In such a situation, pipe 4 will carry to zone 2 a mixture of at least one alkali metal hydroxide and at least one alkali metal peroxide. The extent of oxidation of alkali metal hydroxide to the corresponding peroxide in unit 25 can vary widely depending upon the amount of air employed. Air is generally employed in an amount sufficient to produce a maximum amount of peroxide obtainable under equilibrium conditions. This procedure is fully and completely disclosed in Z. Anorg. Allgem Chemie, vol. 298, pages 295 to 301, 1959, the article by Lux, Kuhn, and Niedermaier, entitled "Reactions and Equilibria in Molten Alkali Hydroxides, Part III, Peroxide Equilibria," the disclosure of which is incorporated herein by reference. For example, sufficient air can be introduced into a sodium hydroxide stream so that the resultant stream at equilibrium contains three weight percent sodium peroxide, while with a potassium hydroxide stream sufficient air can be introduced to produce a stream containing 54 weight percent potassium peroxide, and so on.

In separation zone 10, the ash is at least partly soluble in a molten alkali metal hydroxide whereas it is primarily not soluble and precipitates in an aqueous alkali metal hydroxide. In separation zone 14 sufficient alkaline earth metal oxide is added at least to react with substantially all carbonate present in zone 14, the alkaline earth metal carbonate so formed precipitating from the aqueous alkali metal hydroxide.

The reaction temperature in zone 2 can vary from the melting point of the alkali metal hydroxide or any combination present to 1300° F., and can generally be from about 350° to about 1300° F., preferably from about 900° to about 1100° F. The pressure in zone 2 can vary from substantially atmospheric to 1000 p.s.i.g., elevated pressures being desirable to increase hydrogen formation.

The air passed through unit 25 to form alkali metal peroxide will generally be at a temperature of from about 750 to about 1200° F. The temperature in zone 10 will be below the critical temperature of water, with sufficient pressure to maintain the liquid phase. Zone 14 will be substantially at ambient temperature.

The amounts of carbon, alkali metal hydroxide and water supplied to zone 2 can vary widely, the maximum amount of carbon being expressed by the mol ratio of carbon/alkali metal hydroxide/water of 1/2/1, respectively. Generally, a stoichiometric excess of alkali metal alkali metal hydroxide present can be from about one to about four while the mol ratio ranges for each of the carbonaceous feed and water present can be from about 0.5 to about 2. Enough peroxide is supplied to provide oxygen for combustion sufficient to maintain the required temperature in zone 2.

The feed material in pipe 1 can be any carbonaceous material be it gas, solid, liquid, or a combination thereof, and which can react with steam under elevated temperatures to undergo the conventional steam-carbon reaction. Such materials include all ranks of coal, lignite, peat, elemental carbon, oil shale, tar sands, coke from coal or petroleum derived products, char, other carbonaceous solid residue, coal extract, residual fuel oil, low temperature tar pitch, shale oil, crude oil, other hydrocarbonaceous solids and liquids, and the like.

In the following examples all runs were carried out using a right cylindrical high purity alumina reactor which was permanently closed at one end and which had a removable reactor head closing the opposing open end. A feed stream passed through the reactor head through a feed conduit which extended to the closed end of the reactor so that feed passed from the closed end of the reactor back along the full length of the reactor to reach its exit conduit in the removable reactor head. At the closed end of the reactor adjacent to where the feed exited from its feed conduit, there was employed a high purity alumina pellet packing wherein the pellets had a ⅛ inch outside diameter and ¼ inch length. The packing functioned as a gas distributor. A body of molten alkali metal or alkali metal compound depending upon the particular experiment was placed outside the feed conduit in the annulus between the feed conduit and the inner surface of the reactor and extended approximately half the length of the reactor starting from its permanently closed end. Thus, nearest the closed end of the reactor there was a mixture of the molten metal or compound and gas distributor. The carbonaceous reactant was placed in the molten body in the form of pellets of substantially the same dimensions as the alumina pellets for experimental convenience. There is no restriction on particle size of the carbonaceous material. The height of the molten body was equivalent to the bed height of the carbon to insure that the particles were always thoroughly wetted with the molten metal or compound composing the molten body.

Steam was generated by pumping liquid water into a heated Hoke bottle at 300° F. The rate of steam flow was fixed by the feed rate of water into the heated expansion bottle. A Beckman Solution metering pump, model 746, was used to pump the water. The steam was mixed with a small amount of nitrogen purge gas and transferred to the reactor by means of heated copper tubing. The exit gases were passed through a coil trap at 32° F. to remove water and other condensables, if any. After liquid removal, the gases were passed through a gas sampling tube and then to a water-displacement gas collector. In this way, two analytical samples of the hydrogen-nitrogen stream were obtained for each experiment, an instantaneous sample and a total gas sample. Exit gas rate was measured by the rate of water displacement.

EXAMPLE I

One hundred grams of a (Li—Na—K)$_2$CO$_3$ eutectic melt and 75 cubic centimeters of carbon pellets were placed in the reactor and heated to 930° F. Steam at a temperature of 930° F. was passed as the feed through the body of carbon pellets and carbonate melt at a rate of 68 cc. per minute for 30 minutes after which 10 grams of sodium hydroxide were added and steam addition continued at the same rate for 15 minutes.

Before the sodium hydroxide was added very small amounts (4.3 cc. per minute) of hydrogen were formed from water present.

After the addition of the sodium hydroxide, the hydrogen evolution was 24.8 cc. per minute thereby showing that the alkali metal hydroxide is a necessary reactant in the formation of hydrogen and that the alkali metal carbonate is not necessary for the formation of hydrogen.

The above experiment was repeated in all respects except that a (Li—K)Cl eutectic melt was employed instead of the carbonate eutectic melt and with the same results except that in this experiment the chloride melt was dry and there was zero hydrogen evolution before the sodium hydroxide was added. After the sodium hydroxide was added, the hydrogen evolution rate was 29.6 cc. per minute.

EXAMPLE II

The reactor was charged with 200 grams of sodium hydroxide and 75 cc. of carbon pellets and heated to a temperature of 930° F. During the first run a nitrogen purge stream was passed through the feed conduit for 30 minutes and hydrogen was recovered from the reactor at the rate of 4.2 cc. per minute which correlates directly to the amount of water initially present in the sodium hydroxide. Had the sodium hydroxide been completely dry no hydrogen would have evolved.

Thereafter, carbon dioxide at the rate of 61 cubic centimeters per minute was added to the N$_2$ purge stream and passed into the reactor for 30 minutes. The hydrogen evolution increased to 21.2 cubic centimeters per minute.

The above data show that the carbon dioxide upon reacting with the sodium hydroxide to form sodium carbonate yields water which is a source of hydrogen. The alkali metal hydroxide reactant of this invention is useful, not only in removing carbon dioxide from the reaction masses to force the reaction towards the formation of hydrogen gas, but also in forming additional water which is available for the formation of additional hydrogen.

EXAMPLE III

In the first run of this experiment the reaction body in the reactor was composed of 20 cubic centimeters of activated carbon, 150 cubic centimeters of alumina pellets, and 150 grams (10/90 weight ratio) of potassium hydroxide/sodium hydroxide. The reactor was heated to 930° F. For the first 30 minute test only nitrogen at the rate of 52 cubic centimeters per minute was passed through the reactor. For the second 30 minute test the nitrogen rate was maintained and steam at the rate of 342 cubic centimeters per minute was added. For the third 30 minute test the nitrogen rate was maintained and steam at the rate of 683 cubic centimeters per minute was added. The hydrogen evolution for the first test was two cubic centimeters per minute, for the second test was 51 cubic centimeters per minute (apparent steam conversion of 15%), and the third test was 45 cubic centimeters per minute (apparent steam conversion of 7%).

This experiment was repeated in all respects except that 150 grams of sodium hydroxide was employed and the reaction mass was pretreated for one hour with steam at the rate of 342 cubic centimeters per minute. After the pretreatment and for the first 30 minute test, nitrogen at the rate of 41 cubic centimeters per minute was passed through the reaction mass with steam at the rate of 342 cubic centimeters per minute. This was followed by a one-hour nitrogen purge after which a second thirty-minute test with nitrogen at 41 cubic centimeters per minute and steam at 136 cubic centimeters per minute was employed. This was followed by a one-hour nitrogen purge which in turn was followed by a third thirty-minute test of nitrogen at 41 cubic centimeters per minute and steam at 272 cubic centimeters per minute. The hydrogen evolution for the first test was 107 cubic centimeters per minute (apparent steam conversion of 32%), for the second test was 13 cubic centimeters per minute (apparent steam conversion of 10%), and for the third test was 13 cubic centimeters per minute (apparent steam conversion of 5%).

This experiment was repeated again in all respects except that there was no alkali metal hydroxide present at all in the reaction mass. Nitrogen was employed in the feed gas at the rate of 50 cubic centimeters per minute at three temperatures, i.e., 930° F., 970° F., and 1040° F., using a steam feed rate at each temperature of 342 cubic centimeters per minute. In all runs, no more than a trace of hydrogen (which at most would have been in the amount of p.p.m.) was obtained.

It can be seen from the above data that a steam pretreatment of the reaction mass is helpful in enhancing hydrogen evolution and the alkali metal hydroxide is essential to obtaining hydrogen.

EXAMPLE IV

A reaction mass composed of 28 cubic centimeters of activated carbon, 150 cubic centimeters of alumina pellets, and 150 grams of sodium hydroxide was heated to 930° F. and pretreated with steam for 18 hours at a rate of 25 cubic centimeters per minute.

In the first 30-minute period after the pretreatment, nitrogen at the rate of 51 cubic centimeters per minute and steam at the rate of 25 cubic centimeters per minute were passed through the reaction mass and hydrogen was obtained at the rate of 14 cubic centimeters per minute (apparent steam conversion of 56%). The steam feed was then stopped while the nitrogen feed was continued at the rate of 51 cubic centimeters per minute. Sixty minutes after the steam feed had been stopped, hydrogen was still evolving from the reactor at the rate of 13 cubic centimeters per minute. Ninety-seven minutes after the stoppage of steam feed, hydrogen was still evolving at the rate of one cubic centimeter per minute, and after 190 minutes, hydrogen still evolved at the rate of 0.5 cubic centimeters per minute. At the 190-minute point, steam was again added at the rate of 50 cubic centimeters per minute together with the nitrogen at 51 cubic centimeters per minute and the hydrogen evolution increased to 21 cubic centimeters per minute (apparent steam conversion of 42%).

It can be seen from this data that hydrogen continued to evolve from the reactor for three hours after steam additions stopped and that when steam was again added to the reactor the steam conversion returned to essentially the steam conversion after 18 hours pretreatment.

No detectible amounts of carbon monoxide, carbon dioxide, or methane were found in the hydrogen products of any of the experiments of Examples I through IV above.

Due to the similarity of rates of hydrogen evolution throughout the experiments described above to the rates of hydrogen evolution with carbon dioxide as a reactant, it is presently believed that the reaction of steam and carbon takes place because of dissolved water in the molten alkali metal hydroxide. The data in the above examples show that the rate of hydrogen formation is less sensitive to the rate of steam fed to the reactor than to the length of time for steam saturation of the reactor. The latter effect would minimize the possibility of a poor gas-liquid contacting problem to account for the results. Reasonable variations and modifications are possible within the scope of this disclosure without departing from the spirit and scope of this invention.

The embodiments of the invention in which an exclusive property or privilege is claimed are defined as follows:

1. A method for forming substantially pure hydrogen at a temperature below normal water-gas reaction temperatures of greater than 1300° F. comprising reacting a mixture consisting essentially of carbonaceous material, steam, and at least one alkali metal hydroxide using a stoichiometric excess of alkali metal hydroxide and a temperature of from the melting point of the highest melting alkali metal hydroxide used to about 1300° F. to thereby form a heated reaction mass containing hydrogen, alkali metal carbonate, and carbon dioxide; removing hydrogen from said reaction zone; separately from said hydrogen recovering from said reaction zone the remaining materials in said reaction zone which materials substantially comprise water, carbon dioxide, alkali metal hydroxides, alkali metal carbonates, silicates of iron, nickel, cobalt, and vanadium, and carbonates of iron, nickel, cobalt, and vanadium; adding sufficient water to said remaining materials to cool same but not below the melting point of the highest melting alkali metal hydroxide present and thereby precipitate at least the silicates and carbonates of iron, nickel, cobalt, and vanadium; removing said precipitate; adding to said remaining materials after removal of said precipitate therefrom an alkaline earth metal oxide to react with any carbon dioxide and alkali metal carbonate present to form an alkaline earth metal carbonate precipitate, removing said alkaline earth metal carbonate precipitate thereby leaving an aqueous alkali metal hydroxide; passing said aqueous alkali metal hydroxide in heat exchange relation with heated remaining materials from said reaction zone to vaporize water from said aqueous alkali metal hydroxide; and returning at least part of said alkali metal hydroxide to the reaction of carbonaceous material, steam, and alkali metal hydroxide.

2. The method according to claim 1 wherein part of said alkali metal hydroxide used in reacting carbonaceous material, steam, and alkali metal hydroxide is oxidized to the alkali metal peroxide before being exposed to the reaction of carbonaceous material and steam.

3. The method according to claim 2 wherein said alkali metal hydroxide is oxidized in part to the peroxide by passing air therethrough at an elevated temperature of from about 750 to about 1200° F.

4. The method according to claim 1 wherein said carbonaceous material is in the form of elemental carbon, coal, lignite, peat, oil shale, tar sands, coke, char, natural crude oil, synthetic crude oil, coal extract, residual fuel oil, and low-temperature tar pitch.

5. The method according to claim 1 wherein said carbonaceous material, alkali metal hydroxide, and steam are supplied to the reaction in mol ratio ranges of from about 1 to about 4 for said alkali metal hydroxide and from about 0.5 to about 2 for each of said carbonaceous material and water.

6. The method according to claim 1 wherein the mol ratio of carbonaceous materials/alkali metal hydroxide/steam is substantially 1/2/1, respectively.

7. The method according to claim 1 wherein said reaction is carried out at an elevated pressure up to about 1000 p.s.i.g.

8. A method for forming hydrogen comprising reacting a carbonaceous material with steam in a reaction zone at an elevated temperature thereby producing carbon dioxide and hydrogen; charging to said reaction zone at least one alkali metal hydroxide which is free of any alkali metal carbonate and which is substantially molten at said elevated temperature; reacting said at least one alkali metal hydroxide with carbon dioxide present in said reaction zone to form alkali metal carbonate and water thereby removing carbon dioxide from the reaction and providing additional water from which to form hydrogen; said at least one alkali metal hydroxide being supplied in an amount sufficient to react with substantially all the carbon dioxide formed during the reaction; removing said hydrogen from said reaction zone; separately from said hydrogen recovering from said reaction zone the remaining materials in said reaction zone which materials substantially comprise water, carbon dioxide, alkali metal hydroxides, alkali metal carbonates, silicates of iron, nickel, cobalt, and vanadium, and carbonates of iron, nickel, cobalt, and vanadium; adding water to said remaining materials to reduce their temperature but not lower than the melting point of the highest melting alkali metal hydroxide present; said water addition being in an amount sufficient to cause the precipitation of at least the silicates and carbonates of iron, nickel, cobalt, and vanadium; removing said precipitate; adding an alkaline earth metal oxide to said other materials after removal of said precipitate therefrom to react said alkaline earth metal oxide with carbon dioxide and alkali metal carbonates present to form an alkaline earth metal carbonate precipitate; removing said alkaline earth metal carbonate precipitate thereby leaving aqueous alkali metal hydroxide; removing at least part of the water from said aqueous alkali metal hydroxide thereby leaving alkali metal hydroxide for reuse in said reaction zone.

References Cited

UNITED STATES PATENTS

| | | | |
|---|---|---|---|
| 2,682,455 | 6/1954 | Gorin | 23—212 R X |
| 3,252,773 | 5/1966 | Solomon et al. | 23—211 X |
| 3,252,774 | 5/1966 | McMahon et al. | 48—214 |
| 3,440,177 | 4/1969 | Patton et al. | 23—212 R X |
| 3,607,066 | 9/1971 | Basch et al. | 23—221 X |
| 3,647,358 | 3/1972 | Greenberg | 23—1 D |

EDWARD STERN, Primary Examiner

U.S. Cl. X.R.

423—421, 432, 650, 659, 411, 326